Oct. 2, 1923.

F. E. KRONENBITTER

GREASE GUN

Filed July 5, 1921

1,469,308

Witnesses:
W. Schnellhardt.
H. S. Weidman

Inventor
Frank E. Kronenbitter
By Joshua R. H. Potts
His Attorney

Patented Oct. 2, 1923.

1,469,308

UNITED STATES PATENT OFFICE.

FRANK E. KRONENBITTER, OF MAYWOOD, ILLINOIS.

GREASE GUN.

Application filed July 5, 1921. Serial No. 482,342.

*To all whom it may concern:*

Be it known that I, FRANK E. KRONENBITTER, a citizen of the United States, and a resident of city of Maywood, county of Cook, and State of Illinois, have invented certain new and useful Improvements in Grease Guns, of which the following is a specification.

My invention relates to a novel grease gun and has for its object the provision of a device which will be particularly useful in lubricating springs of vehicles in an efficient and convenient manner without soiling the hands or clothes of the user and which provides a detachable container for lubricant which can be discarded when empty, and a similar filled container substituted therefor.

A particular object of the invention is the form of nozzle employed, as by the use of same the lubricant in the container may be injected between the leaves of the springs in an efficient manner, and as graphite or thick grease has been found to be most desirable for such lubrication, the nozzle of my device is particularly designed to effectively deposit such grease between the leaves of the springs and spread same by moving the nozzle along the spring so as to distribute the grease in the most advantageous manner.

Other objects will appear hereinafter.

The invention consists in the combinations and arrangements of parts hereinafter described and claimed.

Figure 1:
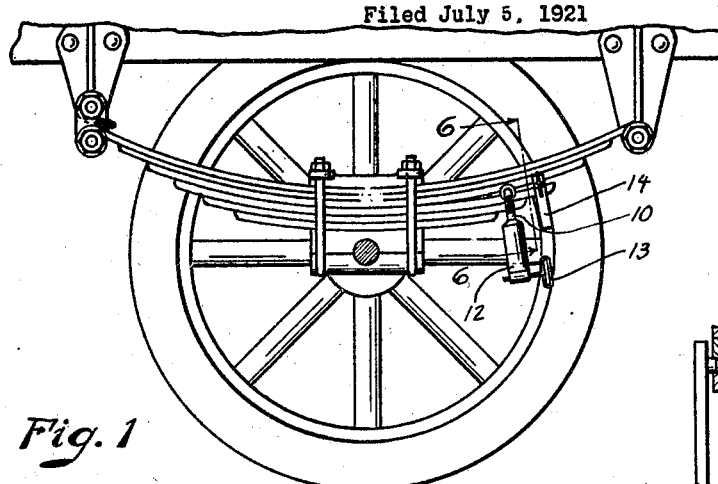
Figure 6:
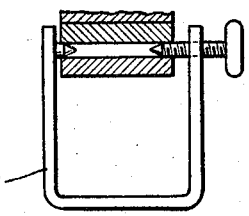
Figure 7:
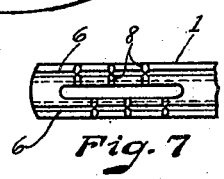
Figure 4:
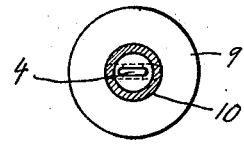
Figure 2:
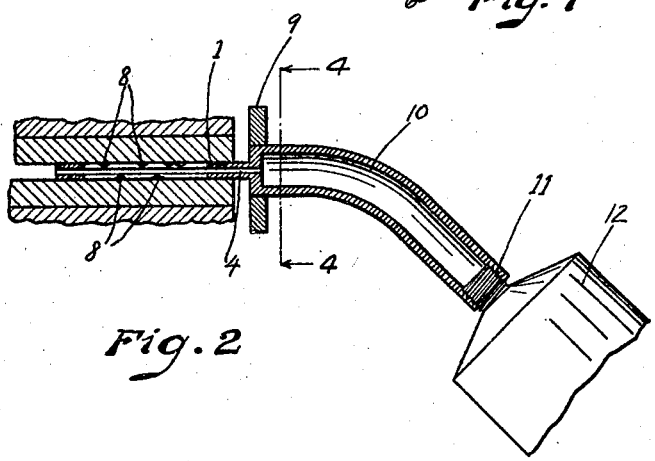
Figure 5:
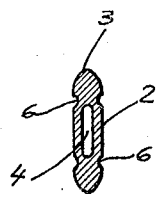
Figure 3:
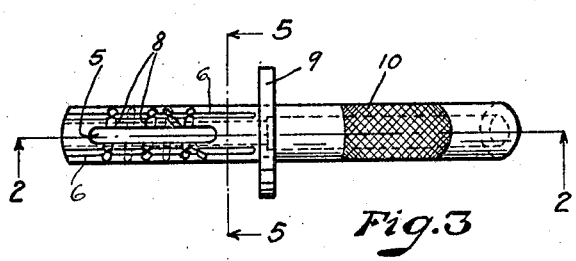

The invention will be best understood by reference to the accompanying drawings forming a part of this specification, and in which, Fig. 1 is a view of a vehicle spring showing the device in operative position, Fig. 2 is a sectional side view of the device showing the nozzle of same inserted between the leaves of a spring, Fig. 3 is a top plan view of the device, showing the preferred disposition of the grooves on the nozzle, Fig. 4 is a section on line 4—4 of Fig. 2, Fig. 5 is a section on line 5—5 of Fig. 3, Fig. 6 is a view of a clamp which may be used in connection with my invention, Fig. 7 is a plan view of the nozzle showing a modified form thereof.

Proper lubrication of vehicle springs is ordinarily a difficult and disagreeable task, and an efficient and convenient device for accomplishing such lubrication apparently has not been discovered, and especially is this true in regard to successfully placing graphite or other thick greases, which have been found to be the most desirable for lubricating springs, between the leaves of such springs. By use of my device such greases can be quickly and conveniently deposited and distributed between the leaves of the spring so as to thoroughly lubricate same.

In carrying out my invention, I preferably provide a lubricating gun consisting of a nozzle 1 which may be of any desirable size or shape, but preferably has flat sides 2 and tapered edges 3. The nozzle is provided with an opening 4 which communicates with a grease supply, and is also provided with elongated slots 5 which communicate with opening 4 and are disposed parallel therewith. Each side of the nozzle is preferably provided with longitudinal grooves 6, and with transverse grooves 8. The grooves 8 may be positioned in any suitable manner across the nozzle, but I have found that either obliquely disposed grooves, crisscross grooves (for instance, see Fig. 3), or broken grooves having their opposite ends staggered with respect to each other (see Fig. 7) are most desirable for proper operation of the device. The shape of the nozzle 1 and disposition of the grooves thereof has been found to be important as when the nozzle is moved between the spring leaves (which usually cannot be spread very much), the longitudinal grooves 6 retain part of the grease thereby preventing all of the grease being deposited on the spring at the same time, and the transverse grooves 8 permit the grease to be forced out of the slots 5 into the various grooves and evenly spread thereby as the nozzle is moved between the spring leaves. By reason of its tapered edges the nozzle will not scrape the grease back and forth as the nozzle is moved back and forth, but will spread an even layer of grease between the spring leaves as it moves therebetween.

Attached to the rear end of the nozzle 1 is a guard plate 9 which may be of any suitable size or shape, but is shown as circular. The guard plate is provided to prevent grease coming in contact with the fingers, and to keep the device free from grease except at the nozzle 1.

Secured to and preferably integral with the nozzle 1 is a tubular neckpiece 10, having its outer end interiorly threaded as shown at 11.

Attached to the end of the tubular neckpiece 10 is a collapsible tube 12 which contains graphite or other grease which it is desired to inject between the spring leaves. The tube 12 may be of any suitable material but is preferably tin or lead foil and is provided with a threaded nipple for detachably engaging with the threaded end 11 of the neckpiece 10. The tube 12 also is preferably provided with a stiff wire key 13 which is adapted to squeeze the tube and force grease through the nozzle 1, and also assures complete emptying of the tube.

Tubes of this character may be filled with graphite or other suitable grease and placed on sale along with the nozzle, and may also be sold separately to take the place of empty tubes. In operation, the leaves of the spring to be lubricated are first spread apart by any suitable means such as a clamp 14, and the nozzle 1 inserted therebetween. The key is then turned compressing the tube and forcing grease out of the slots 5, and the nozzle is moved back and forth between the spring leaves, spreading the grease thereon uniformly in the desired quantities, the shape of the nozzle and the arrangement of the grooves being such that the grease is evenly distributed and the nozzle used like a paddle, without likelihood of clogging up the openings in the nozzle 1. The device is of great commercial value, is simple in construction and efficient in operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A grease gun for vehicle springs comprising a nozzle adapted to be inserted between the leaves of a spring there being longitudinal openings in said nozzle, and transverse grooves communicating with said openings; and means for supplying grease to said nozzle, substantially as described.

2. A grease gun for vehicle springs comprising a nozzle adapted to be inserted between the leaves of a spring there being longitudinal openings in said nozzle, longitudinal grooves disposed adjacent said openings and transverse grooves communicating with said openings and said longitudinal grooves; and means for supplying grease to said nozzle, substantially as described.

3. A grease gun for vehicle springs comprising a nozzle adapted to be inserted between the leaves of a spring, having a passage extending longitudinally therethrough, there being longitudinal openings in said nozzle communicating with said passage; and means for supplying grease to said nozzle, substantially as described.

4. A grease gun for vehicle springs comprising a nozzle having a longitudinal passage therethrough, there being longitudinal openings in its sides communicating with said passage, longitudinal grooves disposed adjacent said openings together with transverse grooves communicating with said openings and said longitudinal grooves; and means for supplying grease to said nozzle, substantially as described.

5. A grease gun for vehicle springs comprising a flat nozzle adapted to be inserted between the leaves of a spring, the edges of said nozzle being tapered, said nozzle being provided with longitudinal openings in its sides communicating with a grease supply, and longitudinal grooves disposed adjacent said openings, together with transverse grooves communicating with said openings and said longitudinal grooves; and means for supplying grease to said nozzle, substantially as described.

6. A grease gun for vehicle springs comprising a nozzle having a longitudinal passage therethrough, there being longitudinal openings in its sides communicating with said passage, longitudinal grooves disposed adjacent said openings, together with oblique, transverse, criss-cross grooves communicating with said openings and said longitudinal grooves; and means for supplying grease to said nozzle, substantially as described.

In testimony whereof I have signed my name to this specification in the presence of two subscribing witnesses.

FRANK E. KRONENBITTER.

Witnesses:
JOSHUA R. H. POTTS,
FREDA C. APPLETON.